United States Patent
Fellmeth

(10) Patent No.: US 12,509,034 B2
(45) Date of Patent: Dec. 30, 2025

(54) BRAKE SYSTEM FOR MOTORCYCLE, AND MOTORCYCLE

(71) Applicant: Robert Bosch GmbH, Stuttgart (DE)

(72) Inventor: Martin Reiner Fellmeth, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 623 days.

(21) Appl. No.: 17/916,608

(22) PCT Filed: Mar. 25, 2021

(86) PCT No.: PCT/IB2021/052479
§ 371 (c)(1),
(2) Date: Oct. 3, 2022

(87) PCT Pub. No.: WO2021/198859
PCT Pub. Date: Oct. 7, 2021

(65) Prior Publication Data
US 2023/0150461 A1    May 18, 2023

(30) Foreign Application Priority Data
Apr. 2, 2020   (JP) .................................. 2020-067077

(51) Int. Cl.
*B60T 8/17*    (2006.01)
*B60T 8/26*    (2006.01)
(Continued)

(52) U.S. Cl.
CPC ............ *B60T 8/1706* (2013.01); *B60T 8/261* (2013.01); *B60T 11/16* (2013.01); *B60T 13/741* (2013.01)

(58) Field of Classification Search
CPC ...... B60T 8/1706; B60T 8/261; B60T 8/3225; B60T 11/16; B60T 13/741
See application file for complete search history.

(56) References Cited

U.S. PATENT DOCUMENTS

| 6,309,029 B1 * | 10/2001 | Wakabayashi | ............ B62L 1/00 |
| | | | 188/106 P |
| 6,733,089 B1 * | 5/2004 | Wakabayashi | ............ B62L 3/08 |
| | | | 188/344 |

(Continued)

FOREIGN PATENT DOCUMENTS

| DE | 10307339 A1 | 9/2004 |
| JP | 2006513904 A | 4/2006 |

(Continued)

OTHER PUBLICATIONS

International Search Report and Written Opinion for Application No. PCT/IB2021/052479 dated Jul. 2, 2021 (8 pages).

*Primary Examiner* — Thomas W Irvin
(74) *Attorney, Agent, or Firm* — Michael Best & Friedrich LLP

(57) ABSTRACT

The present invention has a purpose of improving mountability of a brake system capable of performing slip control operation of a front wheel and a rear wheel to a motorcycle. The present invention further has a purpose of obtaining a motorcycle that includes such a brake system.

In a front-wheel braking section (20), a friction force, which is applied to a front wheel (3) by a first friction application device (21), varies according to a hydraulic pressure of a brake fluid in a master cylinder (22) during service braking and varies by control of a hydraulic pressure adjustment mechanism (32, 33, 36, and the like) by a controller (60) during the slip control operation. In a rear-wheel braking section (40), a friction force, which is applied to a rear wheel (4) by a second friction application device (50), varies by control of an actuator (41) by the controller (60) during the service braking and during the slip control operation.

18 Claims, 5 Drawing Sheets

(51) Int. Cl.
*B60T 11/16* (2006.01)
*B60T 13/74* (2006.01)

(56) References Cited

U.S. PATENT DOCUMENTS

| | | | | |
|---|---|---|---|---|
| 7,357,464 | B2* | 4/2008 | Beulich | B60T 8/261 |
| | | | | 188/344 |
| 7,938,495 | B2* | 5/2011 | Takenouchi | B60T 8/4081 |
| | | | | 303/9.63 |
| 8,881,878 | B2 | 11/2014 | Nishikawa et al. | |
| 2006/0028064 | A1* | 2/2006 | Beulich | B60T 8/1706 |
| | | | | 303/137 |
| 2007/0228819 | A1* | 10/2007 | Takenouchi | B60T 8/4081 |
| | | | | 303/116.1 |
| 2024/0042982 | A1* | 2/2024 | Ohtaka | B62L 1/005 |

FOREIGN PATENT DOCUMENTS

| | | |
|---|---|---|
| JP | 2014015077 A | 1/2014 |
| JP | 2019209710 A | 12/2019 |

\* cited by examiner

[FIG. 1]
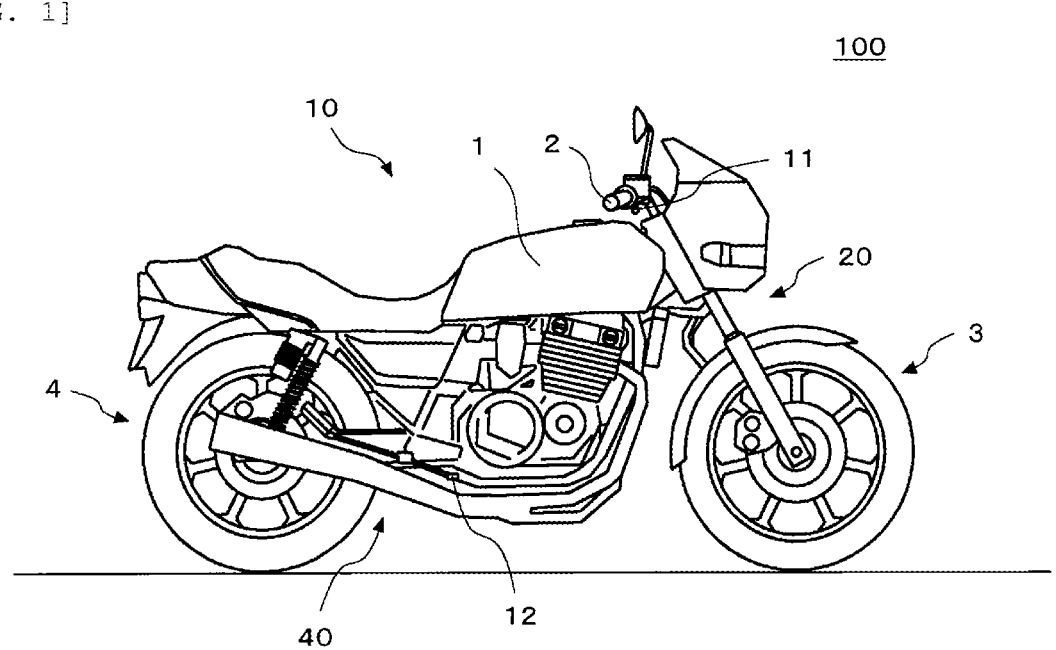

[FIG. 2]
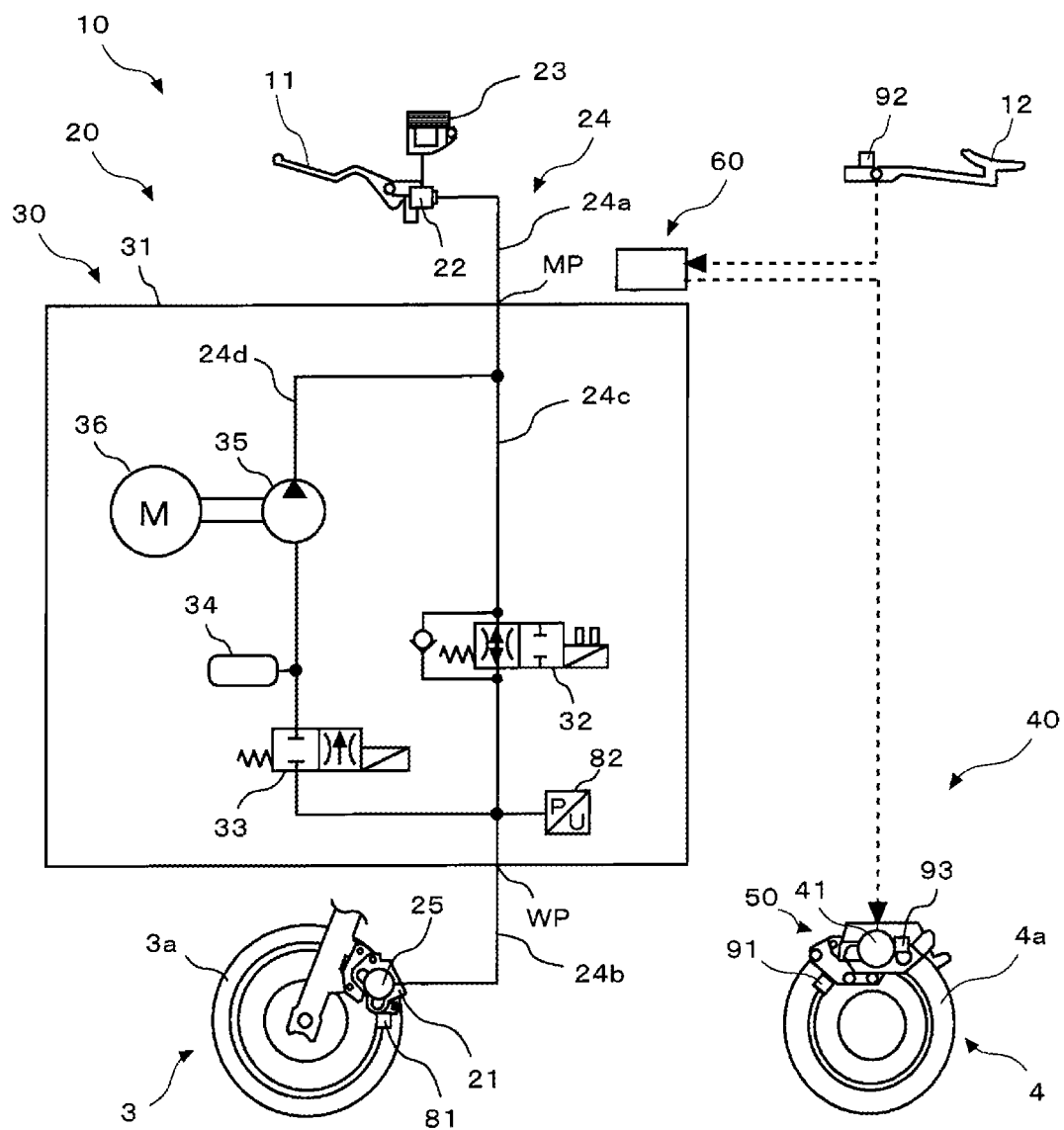
[FIG. 3]
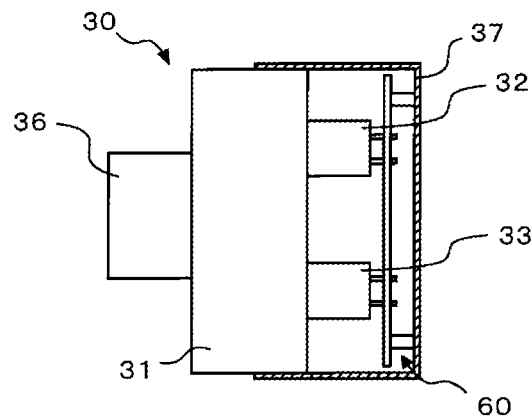

[FIG. 4]
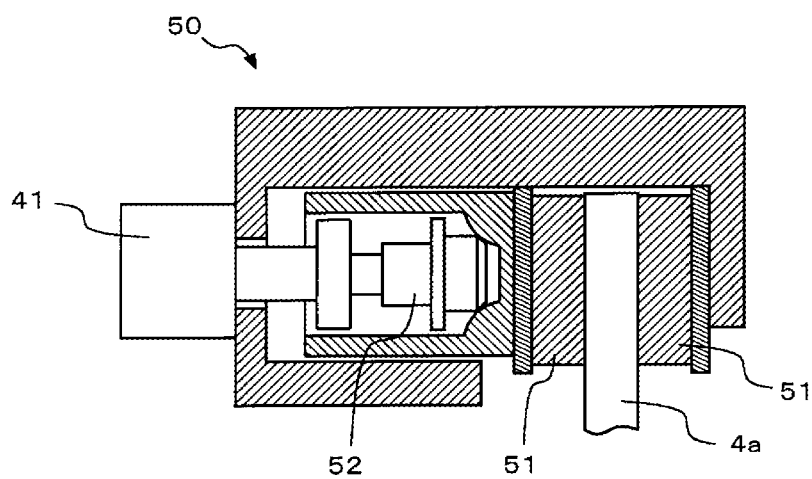
[FIG. 5]
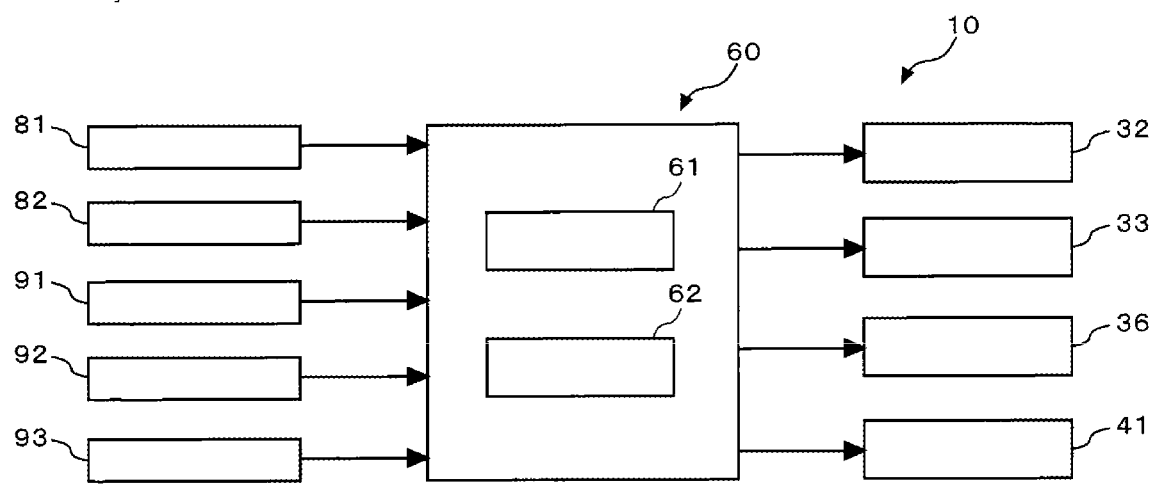

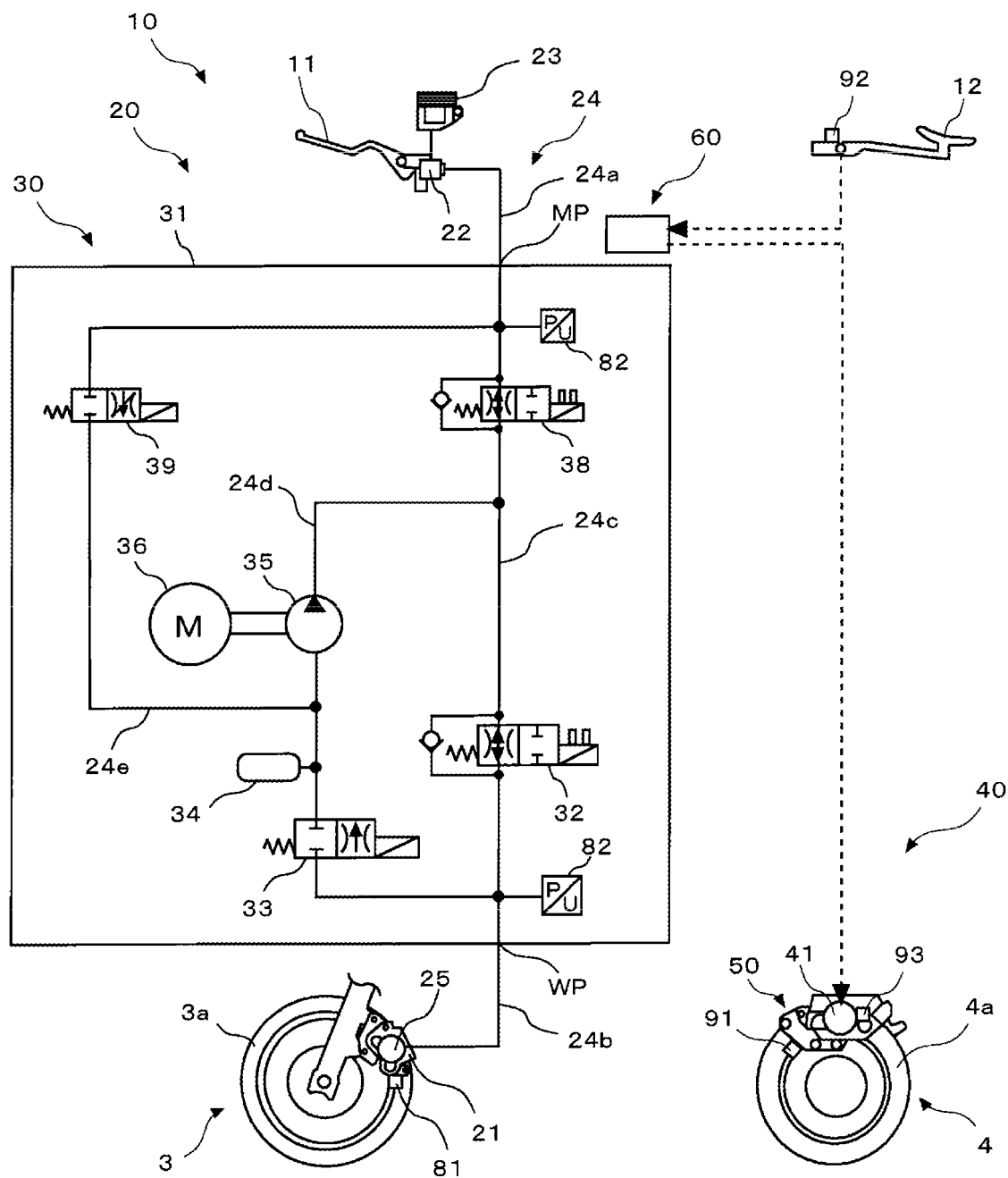
[FIG. 6]

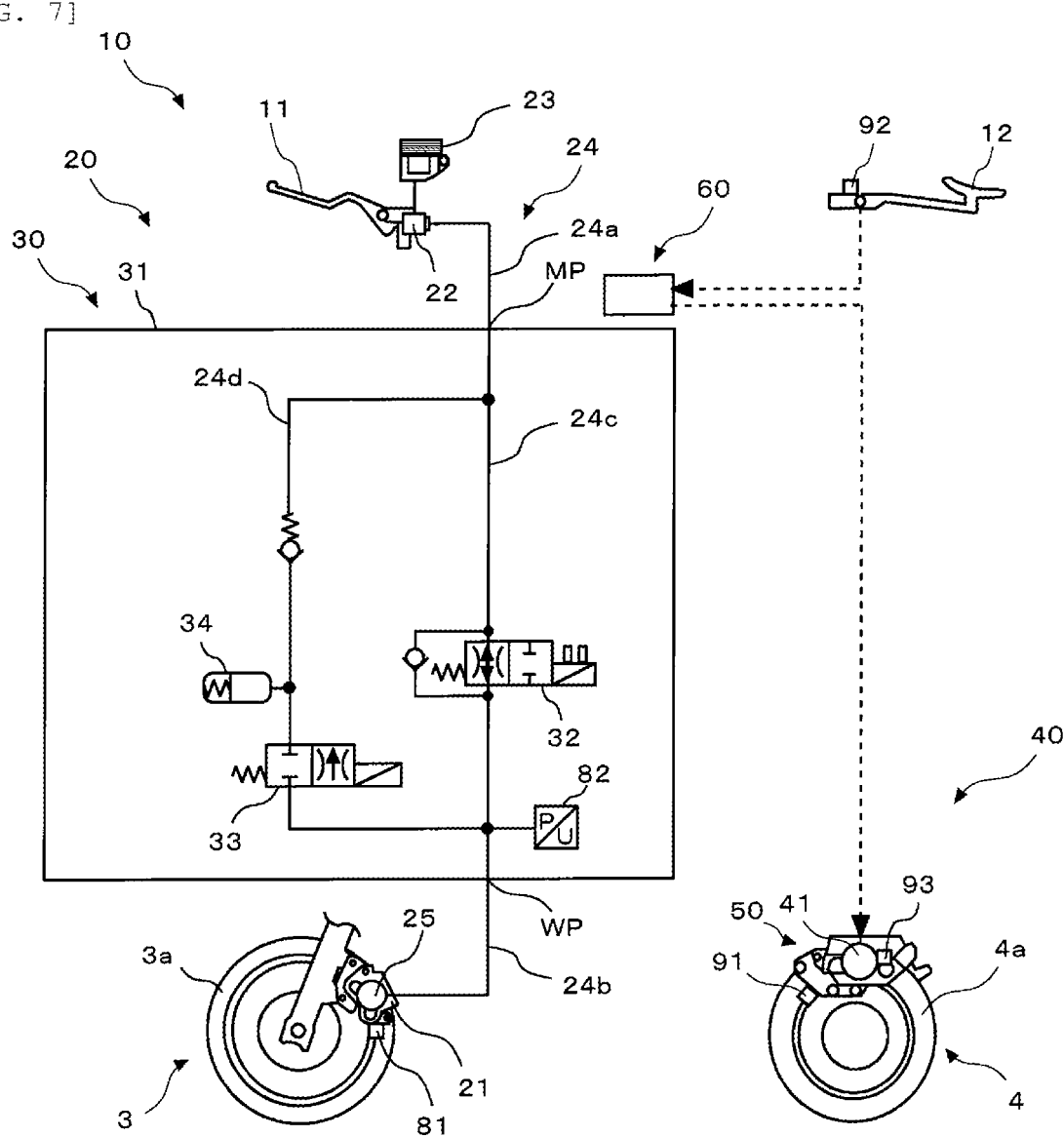
[FIG. 7]

BRAKE SYSTEM FOR MOTORCYCLE, AND MOTORCYCLE

BACKGROUND OF THE INVENTION

The present invention relates to a brake system for a motorcycle, and a motorcycle including such a brake system, the brake system including a first operation element and a second operation element operated by a rider.

A brake system, which includes a first operation element and a second operation element operated by a rider, for a motorcycle has been known. The brake system includes: a front-wheel braking section that includes a first friction application device for braking a front wheel at least with a friction force corresponding to motion of the first operation element; and a rear-wheel braking section that includes a second friction application device for braking a rear wheel at least with a friction force corresponding to motion of the second operation element. The brake system also includes a controller that performs slip control operation to control slips of the front wheel and the rear wheel.

CITATION LIST

Patent Literature

PTL 1: JP-A-2014-15077

SUMMARY OF THE INVENTION

The conventional brake system for the motorcycle is configured that each of the front-wheel braking section and the rear-wheel braking section includes: a master cylinder to which the motion of the operation element is transmitted; a wheel cylinder that communicates with the master cylinder via a fluid path filled with a brake fluid; and a hydraulic pressure adjustment mechanism that adjusts a hydraulic pressure of the brake fluid in the wheel cylinder. In such a configuration, a brake fluid pipe for constituting the fluid path has to be disposed from the front wheel to the rear wheel. The motorcycle has extremely small body size compared to other vehicles (for example, an automobile, a truck, and the like). Thus, in the configuration of the conventional brake system for the motorcycle, there may be a case where a space for disposing the brake fluid pipe and a work space therefor cannot be provided.

The present invention has been made with the above-described problem as the background and therefore has a purpose of improving mountability of the brake system capable of performing slip control operation of a front wheel and a rear wheel to a motorcycle. The present invention further has a purpose of obtaining a motorcycle that includes such a brake system.

Solution to Problem

A brake system according to the present invention is a brake system for a motorcycle, the brake system including a first operation element and a second operation element operated by a rider. The brake system includes: a front-wheel braking section that includes a first friction application device for braking a front wheel of the motorcycle at least with a friction force corresponding to motion of the first operation element; a rear-wheel braking section that includes a second friction application device for braking a rear wheel of the motorcycle at least with a friction force corresponding to motion of the second operation element; and a controller that performs slip control operation for controlling slips of the front wheel and the rear wheel. The front-wheel braking section further includes: a master cylinder, to which the motion of the first operation element is transmitted; a wheel cylinder that communicates with the master cylinder via a fluid path filled with a brake fluid: and a hydraulic pressure adjustment mechanism that adjusts a hydraulic pressure of the brake fluid in the wheel cylinder. In the front-wheel braking section, the friction force, which is applied to the front wheel by the first friction application device, varies according to the hydraulic pressure of the brake fluid in the master cylinder during service braking and varies by control of the hydraulic pressure adjustment mechanism by the controller during the slip control operation. The rear-wheel braking section further includes: a second operation element motion sensor that detects motion of the second operation element; and an actuator that is unitized with the second friction application device. In the rear-wheel braking section, the friction force, which is applied to the rear wheel by the second friction application device, varies according to control of the actuator by the controller corresponding to a detection result of the second operation element motion sensor during the service braking and varies by the control of the actuator by the controller during the slip control operation.

A motorcycle according to the present invention includes the above-described brake system.

Advantageous Effects of Invention

In the brake system according to the present invention, the front-wheel braking section is configured to include: the master cylinder, to which the motion of the first operation element is transmitted; the wheel cylinder that communicates with the master cylinder via the fluid path filled with the brake fluid; and the hydraulic pressure adjustment mechanism that adjusts the hydraulic pressure of the brake fluid in the wheel cylinder, and the rear-wheel braking section is configured to include: the second operation element motion sensor that detects the motion of the second operation element; and the actuator that is unitized with the second friction application device. In the front-wheel braking section, the friction force, which is applied to the front wheel by the first friction application device, varies according to the hydraulic pressure of the brake fluid in the master cylinder during the service braking and varies by the control of the hydraulic pressure adjustment mechanism by the controller during the slip control operation. Meanwhile, in the rear-wheel braking section, the friction force, which is applied to the rear wheel by the second friction application device, varies by the control of the actuator by the controller during the service braking and during the slip control operation. Thus, disposition of a brake fluid pipe for constituting the fluid path in a further narrow area suffices. In addition, the slip of the front wheel, which has a significant impact on behavior of the motorcycle, can be suppressed by controlling the hydraulic pressure, that is, by control with superior responsiveness. As a result, it is possible to simultaneously improve the mountability and secure safety.

BRIEF DESCRIPTION OF THE DRAWINGS

FIG. 1 is a view illustrating a configuration of a motorcycle to which a brake system according to an embodiment of the present invention is mounted.

FIG. 2 is a view illustrating a configuration of the brake system according to the embodiment of the present invention.

FIG. 3 is a view illustrating a configuration of a hydraulic pressure adjustment unit in the brake system according to the embodiment of the present invention.

FIG. 4 is a view illustrating a configuration of main components of a rear-wheel braking section in the brake system according to the embodiment of the present invention.

FIG. 5 is a system configuration diagram of the brake system according to the embodiment of the present invention.

FIG. 6 is a view illustrating a modified example of the configuration of the brake system according to the embodiment of the present invention.

FIG. 7 is a view illustrating another modified example of the configuration of the brake system according to the embodiment of the present invention.

DETAILED DESCRIPTION

A description will hereinafter be made on the present invention with reference to the drawings.

The following description will be made on a case where a brake system according to the present invention is applied to a two-wheeled motor vehicle. However, the brake system according to the present invention may be applied to a motorcycle other than the two-wheeled motor vehicle. The motorcycle includes a three-wheeled motor vehicle. Examples of the two-wheeled motor vehicle and the three-wheeled motor vehicle are a motorbike, a scooter, and an electric scooter. In addition, the following description will be made on a case where a front-wheel braking section is only connected to a first operation element and a rear-wheel braking section is only connected to a second operation element. However, at least one of the front-wheel braking section and the rear-wheel braking section may be connected to both of the first operation element and the second operation element.

A configuration, operation, and the like, which will be described below, constitute merely one example, and the brake system according to the present invention is not limited to a case with such a configuration, such operation, and the like.

In the drawings, the same or similar members or portions will be denoted by the same reference sign or will not be denoted by the reference sign. In addition, a detailed structure will appropriately be illustrated in a simplified manner or will not be illustrated. Furthermore, an overlapping description will appropriately be simplified or will not be made.

EMBODIMENT

A description will hereinafter be made on a brake system according to an embodiment.

<Configuration and Operation of Brake System>

A description will be made on a configuration and operation of the brake system according to the embodiment with reference to FIG. 1 to FIG. 7.

FIG. 1 is a view illustrating a configuration of a motorcycle to which the brake system according to the embodiment of the present invention is mounted. FIG. 2 is a view illustrating a configuration of the brake system according to the embodiment of the present invention. FIG. 3 is a view illustrating a configuration of a hydraulic pressure adjustment unit in the brake system according to the embodiment of the present invention. FIG. 4 is a view illustrating a configuration of main components of a rear-wheel braking section in the brake system according to the embodiment of the present invention. FIG. 5 is a system configuration diagram of the brake system according to the embodiment of the present invention. FIG. 6 and FIG. 7 are views, each of which illustrates a modified example of the configuration of the brake system according to the embodiment of the present invention.

As particularly illustrated in FIG. 1 and FIG. 2, a brake system 10 is mounted to a motorcycle 100. The motorcycle 100 includes: a trunk 1; a handlebar 2 that is held in a freely turnable manner by the trunk 1; a front wheel 3 that is held in a freely turnable manner with the handlebar 2 by the trunk 1; and a rear wheel 4 that is held in a freely rotatable manner by the trunk 1.

The brake system 10 includes a first operation element 11 and a second operation element 12 that are operated by a rider. The first operation element 11 is configured as a brake lever that is provided to the handlebar 2, for example, and is operated by the rider's hand. The second operation element 12 is configured as a foot pedal that is provided to a lower portion of the trunk 1, for example, and is operated by the rider's foot.

The brake system 10 includes: a front-wheel braking section 20 that is hydraulically connected to the first operation element 11; and a rear-wheel braking section 40 that is electrically connected to the second operation element 12. The front-wheel braking section 20 brakes the front wheel 3 with a friction force corresponding to an operation amount of the first operation element 11 by pressing a friction member (not illustrated) of a first friction application device 21, which is held by the trunk 1, against a disc rotor 3a rotating with the front wheel 3. The rear-wheel braking section 40 brakes the rear wheel 4 with a friction force corresponding to an operation amount of the second operation element 12 by pressing a friction member 51 of a second friction application device 50, which is held by the trunk 1, against a disc rotor 4a rotating with the rear wheel 4. The first friction application device 21 and the second friction application device 50 may be structured differently. For example, the first friction application device 21 may generate the friction force corresponding to the operation amount of the first operation element 11 by pressing a friction member of a brake shoe, which is held by the trunk 1, against a brake drum rotating with the front wheel 3. In addition, the second friction application device 50 may generate the friction force corresponding to the operation amount of the second operation element 12 by pressing a friction member of a brake shoe, which is held by the trunk 1, against a brake drum rotating with the rear wheel 4.

The front-wheel braking section 20 includes: a master cylinder 22 to which motion of the first operation element 11 is transmitted; a reservoir 23 attached to the master cylinder 22; a wheel cylinder 25 that communicates with the master cylinder 22 via a fluid path 24 filled with a brake fluid and is installed in the first friction application device 21; a brake fluid pipe 24a that constitutes apart of the fluid path 24 and one end of which is connected to the master cylinder 22; a brake fluid pipe 24b that constitutes a part of the fluid path 24 and one end of which is connected to the wheel cylinder 25; and a hydraulic pressure adjustment unit 30 that is connected to the other end of the brake fluid pipe 24a and the other end of the brake fluid pipe 24b. The brake fluid pipe 24a may not be used, and the hydraulic pressure adjustment unit 30 may directly be connected to the master cylinder 22.

In addition, the brake fluid pipe 24b may not be used, and the hydraulic pressure adjustment unit 30 may directly be connected to the wheel cylinder 25. Alternatively, the hydraulic pressure adjustment unit 30 may be unitized with the master cylinder 22 or the wheel cylinder 25.

As particularly illustrated in FIG. 2 and FIG. 3, the hydraulic pressure adjustment unit 30 includes a base body 31. The base body 31 is formed with: a master cylinder port MP to which the brake fluid pipe 24a is connected; a wheel cylinder port WP to which the brake fluid pipe 24b is connected; a primary fluid path 24c that constitutes a part of the fluid path 24 and is an internal fluid path connecting the master cylinder port MP and the wheel cylinder port WP; and a secondary fluid path 24d that constitutes a part of the fluid path 24 and is an internal fluid path bypassing the primary fluid path 24c. The brake fluid in the wheel cylinder 25 is released to an intermediate portion of the primary fluid path 24c via the secondary fluid path 24d.

An inlet valve 32 is provided to the primary fluid path 24c. The secondary fluid path 24d is sequentially provided with an outlet valve 33, an accumulator 34 that stores the brake fluid, and a pump 35 from an upstream side. The pump 35 is driven by a motor 36. The inlet valve 32, the outlet valve 33, the accumulator 34, the pump 35, and the motor 36 are assembled to the base body 31. A housing 37 for accommodating at least a part of a controller (ECU) 60 is attached to the base body 31. The inlet valve 32 is an electromagnetic valve that is switched from being opened to being closed and thereby blocks a flow of the brake fluid at a mounted position thereof when being brought from an unenergized state into an energized state by the controller 60, for example. In addition, the outlet valve 33 is an electromagnetic valve that is switched from being opened to being closed and thereby blocks the flow of the brake fluid toward the pump 35 via the mounted position thereof when being brought from the unenergized state into the energized state by the controller 60, for example. The inlet valve 32, the outlet valve 33, and the motor 36 correspond to the "hydraulic pressure adjustment mechanism" in the present invention.

As particularly illustrated in FIG. 2 and FIG. 4, the rear-wheel braking section 40 includes an actuator 41 that is unitized with the second friction application device 50. The actuator 41 may be attached to an outer side of the second friction application device 50 or may be provided in the second friction application device 50. The second friction application device 50 is configured as a floating caliper. The second friction application device 50 may have a different structure. For example, the second friction application device 50 may be configured as an opposed caliper. The second friction application device 50 includes: the paired friction members 51 that hold the disc rotor 4a therebetween; and a spindle 52 that adjusts a distance of each of the friction members 51 from the disc rotor 4a. The actuator 41 is coupled to the spindle 52 and causes linear motion of the spindle 52 to adjust the distance thereof. The actuator 41 is a motor, for example. The linear motion of the spindle 52 may be transmitted to the friction members 51 via an elastic member or may be transmitted to the friction members 51 via a fluid such as a hydraulic fluid.

As particularly illustrated in FIG. 2 and FIG. 5, the controller 60 includes: a first control section 61 that governs operation of the inlet valve 32, the outlet valve 33, and the motor 36; and a second control section 62 that governs operation of the actuator 41. The first control section 61 and the second control section 62 may be provided as one unit or may be divided into multiple units. Each of the first control section 61 and the second control section 62 may partially or entirely be constructed of a microcomputer, a microprocessor unit, or the like, may be constructed of a member in which firmware or the like can be updated, or may be a program module or the like that is executed by a command from a CPU or the like, for example.

For example, the controller 60 receives output signals wirelessly or by wire from a front-wheel rotational frequency sensor 81, a brake hydraulic pressure sensor 82, a rear-wheel rotational frequency sensor 91, a second operation element motion sensor 92, a friction member motion sensor 93, and the like. The controller 60 may receive the output signal from another sensor. The controller 60 derives a target braking force to be generated on each of the front wheel 3 and the rear wheel 4 on the basis of those output signals. The first control section 61 sends a command signal, which corresponds to the target braking force to be generated on the front wheel 3, to drivers in the inlet valve 32, the outlet valve 33, and the motor 36 wirelessly or by wire. The second control section 62 sends a command signal, which corresponds to the target braking force to be generated on the rear wheel 4, to a driver in the actuator 41 wirelessly or by wire.

The front-wheel rotational frequency sensor 81 detects a rotational frequency of the front wheel 3. The front-wheel rotational frequency sensor 81 is held by the trunk 1, for example. The front-wheel rotational frequency sensor 81 may detect another physical quantity that can substantially be converted to the rotational frequency of the front wheel 3.

The brake hydraulic pressure sensor 82 detects a hydraulic pressure of the brake fluid in the wheel cylinder 25, for example. For example, the brake hydraulic pressure sensor 82 is provided in an area on the wheel cylinder 25 side from the inlet valve 32 in the primary fluid path 24c. The brake hydraulic pressure sensor 82 may detect another physical quantity that can substantially be converted to the hydraulic pressure of the brake fluid in the wheel cylinder 25.

The rear-wheel rotational frequency sensor 91 detects a rotational frequency of the rear wheel 4. The rear-wheel rotational frequency sensor 91 is held by the trunk 1, for example. The rear-wheel rotational frequency sensor 91 may detect another physical quantity that can substantially be converted to the rotational frequency of the rear wheel 4.

The second operation element motion sensor 92 detects motion of the second operation element 12. Any type of sensor can be adopted as the second operation element motion sensor 92 as long as the second operation element motion sensor 92 detects a physical quantity to which a desired braking force by the rider is reflected. For example, the second operation element motion sensor 92 may detects the operation amount of the second operation element 12 by the rider or may detect a force that is applied to the second operation element 12 by the rider. The second operation element motion sensor 92 is held by the trunk 1, for example. The second operation element motion sensor 92 may detect another physical quantity that can substantially be converted to the operation amount of the second operation element 12 or the force that is applied to the second operation element 12.

The friction member motion sensor 93 detects motion of the friction members 51 in the second friction application device 50. Any type of sensor can be adopted as the friction member motion sensor 93 as long as the friction member motion sensor 93 detects a physical quantity to which the braking force generated on the rear wheel 4 by the second friction application device 50 is reflected. For example, the friction member motion sensor 93 may detect a drive amount of the actuator 41 or may detect a reaction force that acts on the spindle 52. The friction member motion sensor 93 is held by the second friction application device 50, for example. The friction member motion sensor 93 may detect another physical quantity that can substantially be converted to the drive amount of the actuator 41 or the reaction force that acts on the spindle 52.

The first control section 61 and the second control section 62 are accommodated in the housing 37 of the hydraulic pressure adjustment unit 30. That is, the first control section 61 and the second control section 62 are unitized with the inlet valve 32, the outlet valve 33, and the motor 36. The second control section 62 may be unitized with the second friction application device 50 and the actuator 41 or may be unitized with the second operation element motion sensor 92.

When the rider operates the first operation element 11 in a state where the motorcycle 100 is stopped or where the motorcycle 100 travels while a slip exceeding a reference value is not generated on the front wheel 3 and the rear wheel 4, that is, during service braking by the front-wheel braking section 20, the first control section 61 controls the inlet valve 32 and the outlet valve 33 in the unenergized state and controls the motor 36 in an undriven state. When the rider operates the first operation element 11, a piston (not illustrated) in the master cylinder 22 is pressed to increase the hydraulic pressure of the brake fluid in the wheel cylinder 25, the friction member (not illustrated) of the first friction application device 21 is pressed against the disc rotor 3a, and the front wheel 3 is thereby braked. When the rider releases the first operation element 11, the piston (not illustrated) in the master cylinder 22 returns to reduce the hydraulic pressure of the brake fluid in the wheel cylinder 25, and the friction member (not illustrated) of the first friction application device 21 separates from the disc rotor 3a. That is, during the service braking, in the front-wheel braking section 20, the friction force that is applied to the front wheel 3 by the first friction application device 21 varies according to the hydraulic pressure of the brake fluid in the master cylinder 22. When the rider operates the first operation element 11, in addition to the application of the friction force to the front wheel 3 by the first friction application device 21, interlocking brake control operation may be performed to apply the friction force to the rear wheel 4 by the second friction application device 50.

When the rider operates the second operation element 12 in the state where the motorcycle 100 is stopped or where the motorcycle 100 travels while the slip exceeding the reference value is not generated on the front wheel 3 and the rear wheel 4, that is, during service braking by the rear-wheel braking section 40, the second control section 62 drives the actuator 41 with the drive amount that corresponds to the output signal of the second operation element motion sensor 92. When the rider operates the second operation element 12, the spindle 52 is pushed out by driving of the actuator 41, the friction members 51 of the second friction application device 50 are pressed against the disc rotor 4a, and the rear wheel 4 is thereby braked. When the rider releases the second operation element 12, the spindle 52 returns by driving of the actuator 41, and the friction members 51 of the second friction application device 50 separate from the disc rotor 4a. That is, during the service braking, in the rear-wheel braking section 40, the friction force that is applied to the rear wheel 4 by the second friction application device 50 varies by the control of the actuator 41 by the controller 60 that corresponds to the detection result by the second operation element motion sensor 92. When the rider operates the second operation element 12, in addition to the application of the friction force to the rear wheel 4 by the second friction application device 50, interlocking brake control operation may be performed to apply the friction force to the front wheel 3 by the first friction application device 21.

The stop of the motorcycle 100 and the slip generated on the front wheel 3 and the rear wheel 4 can be determined by a well-known method using the output signals of the front-wheel rotational frequency sensor 81 and the rear-wheel rotational frequency sensor 91.

In the case where the motorcycle 100 travels in a state where the slip exceeding the reference value is generated on the front wheel 3 or the rear wheel 4, the controller 60 performs slip control operation to suppress the slip. Examples of the slip control operation are operation to execute anti-lock brake control for each of the wheels, operation to execute wheel slip suppression control for each of the wheels, and operation to execute sideslip suppression control for each of the wheels. When performing the slip control operation, the controller 60 may control, in addition to the brake system 10, another system that is mounted to the motorcycle 100.

During the slip control operation, when it is necessary to reduce the friction force applied to the front wheel 3, the first control section 61 controls the inlet valve 32 and the outlet valve 33 in the energized state and drives the motor 36 with the drive amount that corresponds to the output signal of the brake hydraulic pressure sensor 82. By such control, the hydraulic pressure of the brake fluid in the wheel cylinder 25 is reduced, and the friction member (not illustrated) of the first friction application device 21 separates from the disc rotor 3a. That is, during the slip control operation, in the front-wheel braking section 20, the friction force that is applied to the front wheel 3 by the first friction application device 21 varies by the control of the inlet valve 32, the outlet valve 33, and the motor 36 by the controller 60. Instead of the output signal of the brake hydraulic pressure sensor 82, command signals to the drivers in the inlet valve 32, the outlet valve 33, and the motor 36, which are sent by the first control section 61 immediately before sending of the output signal of the brake hydraulic pressure sensor 82, may be used.

During the slip control operation, when it is necessary to reduce the friction force applied to the rear wheel 4, the second control section 62 drives the actuator 41 with the drive amount that corresponds to the output signal of the friction member motion sensor 93. By such control, the spindle 52 returns, and the friction members 51 of the second friction application device 50 separate from the disc rotor 4a. That is, during the slip control operation, in the rear-wheel braking section 40, the friction force that is applied to the rear wheel 4 by the second friction application device 50 varies by the control of the actuator 41 by the controller 60. Instead of the output signal of the friction member motion sensor 93, a command signal to the driver in the actuator 41, which is sent by the second control section 62 immediately before sending of the output signal of the friction member motion sensor 93, may be used.

The brake system 10 may be configured to be able to reduce or increase the friction force applied to the front wheel 3 during the slip control operation. That is, as illustrated in FIG. 6, a pressure boosting fluid path 24e as an internal channel may be formed in the base body 31 of the hydraulic pressure adjustment unit 30. One end of the pressure boosting fluid path 24e is connected to a portion of the primary fluid path 24c that is on the master cylinder 22 side from a merging portion with a downstream end of the secondary fluid path 24d, and the other end is connected to a portion of the secondary fluid path 24d between the accumulator 34 and the pump 35. A switching valve 38 is provided between a merging portion of the primary fluid path 24c with the pressure boosting fluid path 24e and the merging portion of the primary fluid path 24c with the downstream end of the secondary fluid path 24d, and a booster regulator 39 is provided to the pressure boosting fluid path 24e. The switching valve 38 is an electromagnetic valve that is switched from being opened to being closed and thereby blocks the flow of the brake fluid at a mounted position thereof when being brought from the unenergized state into the energized state by the controller 60, for example. The booster regulator 39 is an electromagnetic valve that is switched from being closed to being opened and thereby allows the flow of the brake fluid toward the pump 35 via a mounted position thereof when being brought from the unenergized state into the energized state by the controller 60, for example. The switching valve 38 and the booster regulator 39 correspond to the "hydraulic pressure adjustment mechanism" in the present invention.

During the slip control operation, when it is necessary to increase the friction force applied to the front wheel 3, the first control section 61 controls the inlet valve 32 and the outlet valve 33 in the unenergized state, controls the switching valve 38 and the booster regulator 39 in the energized state, and drives the motor 36 with the drive amount that corresponds to the output signal of the brake hydraulic pressure sensor 82. By such control, the hydraulic pressure of the brake fluid in the wheel cylinder 25 is increased, and the friction member (not illustrated) of the first friction application device 21 is pressed against the disc rotor 3a. That is, during the slip control operation, in the front-wheel braking section 20, the friction force that is applied to the front wheel 3 by the first friction application device 21 varies by the control of the inlet valve 32, the outlet valve 33, the switching valve 38, the booster regulator 39, and the motor 36 by the controller 60. Instead of the output signal of the brake hydraulic pressure sensor 82, the command signals to the drivers in the inlet valve 32, the outlet valve 33, the switching valve 38, the booster regulator 39, and the motor 36, which are sent by the first control section 61 immediately before sending of the output signal of the brake hydraulic pressure sensor 82, may be used.

The brake system 10 may be configured to be able to reduce or increase the friction force applied to the rear wheel 4 during the slip control operation. During the slip control operation, when it is necessary to increase the friction force applied to the rear wheel 4, the second control section 62 drives the actuator 41 with the drive amount that corresponds to the output signal of the friction member motion sensor 93. By such control, the spindle 52 is pushed out, and the friction members 51 of the second friction application device 50 are pressed against the disc rotor 4a. That is, during the slip control operation, in the rear-wheel braking section 40, the friction force that is applied to the rear wheel 4 by the second friction application device 50 varies by the control of the actuator 41 by the controller 60. Instead of the output signal of the friction member motion sensor 93, the command signal to the driver in the actuator 41, which is sent by the second control section 62 immediately before sending of the output signal of the friction member motion sensor 93, may be used.

The front-wheel braking section 20 of the brake system 10 may be of a pumpless type. That is, as illustrated in FIG. 7, the pump 35 is not provided to the secondary fluid path 24d.

Even with such a configuration, during the slip control operation, when the first control section 61 executes PWM control on the inlet valve 32 and the outlet valve 33 with a pulse width according to the output signal of the brake hydraulic pressure sensor 82, for example, the brake fluid in the wheel cylinder 25 can return to the master cylinder 22 via the secondary fluid path 24d by a reaction force of a spring mounted in the accumulator 34, and the friction force applied to the front wheel 3 can thereby be reduced. That is, during the slip control operation, in the front-wheel braking section 20, the friction force that is applied to the front wheel 3 by the first friction application device 21 varies by the control of the inlet valve 32 and the outlet valve 33 by the controller 60. Instead of the output signal of the brake hydraulic pressure sensor 82, the command signals to the drivers in the inlet valve 32 and the outlet valve 33, which are sent by the first control section 61 immediately before sending of the output signal of the brake hydraulic pressure sensor 82, may be used.

<Effects of Brake System>

A description will be made on effects of the brake system according to the embodiment.

In the brake system 10, the front-wheel braking section 20 is configured to include: the master cylinder 22, to which the motion of the first operation element 11 is transmitted; the wheel cylinder 25 that communicates with the master cylinder 22 via the fluid path 24 filled with the brake fluid; and the hydraulic pressure adjustment mechanism (for example, the inlet valve 32, the outlet valve 33, the motor 36, the switching valve 38, the booster regulator 39, and the like) that adjusts the hydraulic pressure of the brake fluid in the wheel cylinder 25, and the rear-wheel braking section 40 is configured to include: the second operation element motion sensor 92 that detects the motion of the second operation element 12; and the actuator 41 that is unitized with the second friction application device 50. In the front-wheel braking section 20, the friction force, which is applied to the front wheel 3 by the first friction application device 21, varies according to the hydraulic pressure of the brake fluid in the master cylinder 22 during the service braking and varies by the control of the hydraulic pressure adjustment mechanism by the controller 60 during the slip control operation. Meanwhile, in the rear-wheel braking section 40, the friction force, which is applied to the rear wheel 4 by the second friction application device 50, varies by the control of the actuator 41 by the controller 60 during the service braking and during the slip control operation. Thus, the disposition of the brake fluid pipe for constituting the fluid path 24 in a further narrow area suffices. In addition, the slip of the front wheel 3, which has the significant impact on behavior of the motorcycle 100, can be suppressed by controlling the hydraulic pressure, that is, by the control with the superior responsiveness. As a result, it is possible to simultaneously improve the mountability and secure safety.

Preferably, the controller 60 includes the first control section 61 that governs the operation of the hydraulic pressure adjustment mechanism (for example, the inlet valve 32, the outlet valve 33, the motor 36, the switching valve 38, the booster regulator 39, and the like) and the second control section 62 that governs the operation of the actuator 41. The first control section 61 and the second control section 62 are unitized with the hydraulic pressure adjustment mechanism. With such a configuration, a sealing structure can be shared among the first control section 61 and the second control section 62, which cuts down on cost of the brake system 10.

Preferably, the controller 60 includes the first control section 61 that governs the operation of the hydraulic pressure adjustment mechanism (for example, the inlet valve 32, the outlet valve 33, the motor 36, the switching valve 38, the booster regulator 39, and the like) and the second control section 62 that governs the operation of the actuator 41. The first control section 61 is unitized with the hydraulic pressure adjustment mechanism, and the second control section 62 is unitized with the second friction application device 50 and the actuator 41 or with the second operation element motion sensor 92. With such a configuration, the front-wheel braking section 20 and the rear-wheel braking section 40 can separately be managed, which improves maintainability, a retrofit property, and the like of the brake system 10.

The description has been made so far on the brake system according to the embodiment. However, the brake system according to the present invention is not limited to that in the description of the embodiment. For example, the embodiment may only partially be implemented.

REFERENCE SIGNS LIST

1: Trunk
2: Handlebar
3: Front wheel
4: Rear wheel
10: Brake system
11: First operation element
12: Second operation element
20: Front-wheel braking section
21: First friction application device
22: Master cylinder
23: Reservoir
24: Fluid path
25: Wheel cylinder
30: Hydraulic pressure adjustment unit
31: Base body
32: Inlet valve
33: Outlet valve
34: Accumulator
35: Pump
36: Motor
37: Housing
38: Switching valve
39: Booster regulator
40: Rear-wheel braking section
41: Actuator
50: Second friction application device
51: Friction member
52: Spindle
60: Controller
61: First control section
62: Second control section
81: Front-wheel rotational frequency sensor
82: Brake hydraulic pressure sensor
91: Rear-wheel rotational frequency sensor
92: Second operation element motion sensor
93: Friction member motion sensor
100: Motorcycle

The invention claimed is:

1. A brake system (10) for a motorcycle (100), the brake system (10) including a first operation element (11) and a second operation element (12) operated by a rider, the brake system (10) comprising:
a front-wheel braking section (20) that includes a first friction application device (21) for braking a front wheel (3) of the motorcycle (100) at least with a friction force corresponding to motion of the first operation element (11);
a rear-wheel braking section (40) that includes a second friction application device (50) for braking a rear wheel (4) of the motorcycle (100) at least with a friction force corresponding to motion of the second operation element (12); and
a controller (60) that performs slip control operation for controlling slips of the front wheel (3) and the rear wheel (4), wherein
the front-wheel braking section (20) further includes: a master cylinder (22), to which the motion of the first operation element (11) is transmitted; a wheel cylinder (25) that communicates with said master cylinder (22) via a fluid path (24) filled with a brake fluid; and a hydraulic pressure adjustment mechanism (32, 33, 36, 38, 39) that adjusts a hydraulic pressure of the brake fluid in said wheel cylinder (25),
in the front-wheel braking section (20), the friction force, which is applied to the front wheel (3) by the first friction application device (21), varies according to the hydraulic pressure of the brake fluid in the master cylinder (22) during service braking and varies by control of the hydraulic pressure adjustment mechanism (32, 33, 36, 38, 39) by the controller (60) during the slip control operation,
the rear-wheel braking section (40) further includes: a second operation element motion sensor (92) that detects motion of the second operation element (12); and an actuator (41) that is unitized with the second friction application device (50), and
in the rear-wheel braking section (40), the friction force, which is applied to the rear wheel (4) by the second friction application device (50), varies according to control of the actuator (41) by the controller (60) corresponding to a detection result of the second operation element motion sensor (92) during the service braking and varies by the control of said actuator (41) by said controller (60) during the slip control operation,
wherein the controller (60) includes:
a first control section (61) that governs operation of the hydraulic pressure adjustment mechanism (32, 33, 36, 38, 39); and a second control section (62) that governs operation of the actuator (41),
the first control section (61) is unitized with the hydraulic pressure adjustment mechanism (32, 33, 36, 38, 39), and
the second control section (62) is unitized with the second friction application device (50) and the actuator (41).

2. The brake system (10) according to claim 1, wherein the hydraulic pressure adjustment mechanism (32, 33, 36, 38, 39) includes a motor (36) as a drive source of a pump (35) that reduces the hydraulic pressure of the brake fluid in the wheel cylinder (25) during the slip control operation.

3. The brake system (10) according to claim 2, wherein the pump (35) increases the hydraulic pressure of the brake fluid in the wheel cylinder (25) during the slip control operation.

4. The brake system (10) according to claim 1, wherein the front-wheel braking section (20) is of a pumpless type.

5. The brake system (10) according to claim 1, wherein the slip control operation includes operation in which anti-lock brake control is executed.

6. The brake system (10) according to claim 1, wherein the slip control operation includes operation in which wheel slip suppression control is executed.

7. The brake system (10) according to claim 1, wherein the slip control operation includes operation in which side-slip suppression control is executed.

8. The brake system (10) according to claim 1, wherein the controller (60) performs interlocking brake control operation to cause both of the first friction application device (21) and the second friction application device (50) to generate the friction force in a state where only one of the first operation element (11) and the second operation element (12) is operated by the rider.

9. A motorcycle (100) comprising:
the brake system (10) according claim 1.

10. A brake system (10) for a motorcycle (100), the brake system (10) including a first operation element (11) and a second operation element (12) operated by a rider, the brake system (10) comprising:
- a front-wheel braking section (20) that includes a first friction application device (21) for braking a front wheel (3) of the motorcycle (100) at least with a friction force corresponding to motion of the first operation element (11);
- a rear-wheel braking section (40) that includes a second friction application device (50) for braking a rear wheel (4) of the motorcycle (100) at least with a friction force corresponding to motion of the second operation element (12); and
- a controller (60) that performs slip control operation for controlling slips of the front wheel (3) and the rear wheel (4), wherein
- the front-wheel braking section (20) further includes: a master cylinder (22), to which the motion of the first operation element (11) is transmitted; a wheel cylinder (25) that communicates with said master cylinder (22) via a fluid path (24) filled with a brake fluid; and a hydraulic pressure adjustment mechanism (32, 33, 36, 38, 39) that adjusts a hydraulic pressure of the brake fluid in said wheel cylinder (25),
- in the front-wheel braking section (20), the friction force, which is applied to the front wheel (3) by the first friction application device (21), varies according to the hydraulic pressure of the brake fluid in the master cylinder (22) during service braking and varies by control of the hydraulic pressure adjustment mechanism (32, 33, 36, 38, 39) by the controller (60) during the slip control operation,
- the rear-wheel braking section (40) further includes: a second operation element motion sensor (92) that detects motion of the second operation element (12); and an actuator (41) that is unitized with the second friction application device (50), and
- in the rear-wheel braking section (40), the friction force, which is applied to the rear wheel (4) by the second friction application device (50), varies according to control of the actuator (41) by the controller (60) corresponding to a detection result of the second operation element motion sensor (92) during the service braking and varies by the control of said actuator (41) by said controller (60) during the slip control operation,
wherein the controller (60) includes:
- a first control section (61) that governs operation of the hydraulic pressure adjustment mechanism (32, 33, 36, 38, 39); and a second control section (62) that governs operation of the actuator (41),
- the first control section (61) is unitized with the hydraulic pressure adjustment mechanism (32, 33, 36, 38, 39), and
- the second control section (62) is unitized with the second operation element motion sensor (92).

11. The brake system (10) according to claim 10, wherein the hydraulic pressure adjustment mechanism (32, 33, 36, 38, 39) includes a motor (36) as a drive source of a pump (35) that reduces the hydraulic pressure of the brake fluid in the wheel cylinder (25) during the slip control operation.

12. The brake system (10) according to claim 11, wherein the pump (35) increases the hydraulic pressure of the brake fluid in the wheel cylinder (25) during the slip control operation.

13. The brake system (10) according to claim 10, wherein the front-wheel braking section (20) is of a pumpless type.

14. The brake system (10) according to claim 10, wherein the slip control operation includes operation in which anti-lock brake control is executed.

15. The brake system (10) according to claim 10, wherein the slip control operation includes operation in which wheel slip suppression control is executed.

16. The brake system (10) according to claim 10, wherein the slip control operation includes operation in which side-slip suppression control is executed.

17. The brake system (10) according to claim 10, wherein the controller (60) performs interlocking brake control operation to cause both of the first friction application device (21) and the second friction application device (50) to generate the friction force in a state where only one of the first operation element (11) and the second operation element (12) is operated by the rider.

18. A motorcycle (100) comprising:
the brake system (10) according claim 10.

* * * * *